(12) United States Patent
Becker et al.

(10) Patent No.: US 9,579,752 B2
(45) Date of Patent: Feb. 28, 2017

(54) FLUX FORMING AN INSOLUBLE BRAZING RESIDUE

(75) Inventors: Andreas Becker, Lachendorf (DE); Thomas Born, Holle (DE); Alfred Ottmann, Hannover (DE); Hans-Walter Swidersky, Hannover (DE); Placido Garcia-Juan, Hannover (DE)

(73) Assignee: SOLVAY FLUOR GMBH, Hannover (DE)

( * ) Notice: Subject to any disclaimer, the term of this patent is extended or adjusted under 35 U.S.C. 154(b) by 42 days.

(21) Appl. No.: 13/577,716

(22) PCT Filed: Feb. 10, 2010

(86) PCT No.: PCT/EP2010/051626
§ 371 (c)(1),
(2), (4) Date: Aug. 8, 2012

(87) PCT Pub. No.: WO2011/098120
PCT Pub. Date: Aug. 18, 2011

(65) Prior Publication Data
US 2012/0315497 A1    Dec. 13, 2012

(51) Int. Cl.
B23K 35/36    (2006.01)
B23K 1/19    (2006.01)
B23K 35/362    (2006.01)
F28F 21/08    (2006.01)

(52) U.S. Cl.
CPC ......... B23K 35/3605 (2013.01); B23K 1/19 (2013.01); B23K 35/362 (2013.01); B23K 2203/10 (2013.01); F28F 21/08 (2013.01)

(58) Field of Classification Search
CPC ........... B23K 35/3605; B23K 2203/10; B23K 35/362; B22F 7/06
USPC ...................................................... 148/23
See application file for complete search history.

(56) References Cited

U.S. PATENT DOCUMENTS

| | | | |
|---|---|---|---|
| 3,951,328 A | 4/1976 | Wallace et al. | |
| 3,971,501 A | 7/1976 | Cooke | |
| 4,428,920 A | 1/1984 | Willenberg et al. | |
| 4,475,960 A * | 10/1984 | Yamawaki et al. | 148/26 |
| 4,579,605 A | 4/1986 | Kawase et al. | |
| 4,670,067 A | 6/1987 | Suzuki et al. | |
| 4,689,092 A | 8/1987 | Suzuki et al. | |
| 4,906,307 A | 3/1990 | Fujiyoshi | |
| 5,100,048 A | 3/1992 | Timsit | |
| 5,100,486 A | 3/1992 | Krikorian et al. | |
| 5,190,596 A | 3/1993 | Timsit | |
| 5,806,752 A | 9/1998 | Van Evans et al. | |
| 5,862,976 A * | 1/1999 | Yamamoto et al. | 228/224 |
| 6,221,129 B1 | 4/2001 | Belt et al. | |
| 6,432,221 B1 | 8/2002 | Seseke-Koyro et al. | |
| 6,733,598 B2 | 5/2004 | Swidersky et al. | |
| 6,743,409 B2 | 6/2004 | Seseke-Koyro et al. | |
| 6,949,300 B2 | 9/2005 | Gillispie et al. | |
| 2006/0231162 A1 | 10/2006 | Swidersky et al. | |
| 2007/0277908 A1 | 12/2007 | Seseke-Koyro et al. | |
| 2009/0053547 A1 | 2/2009 | Sucke et al. | |

FOREIGN PATENT DOCUMENTS

| | | |
|---|---|---|
| CN | 101407003 A | 4/2009 |
| CN | 101439449 A | 5/2009 |
| DE | 3520923 A1 | 12/1985 |
| EP | 0091231 B1 | 10/1983 |
| EP | 0347106 A1 | 12/1989 |
| EP | 0541259 A1 | 5/1993 |
| EP | 1808264 A1 | 7/2007 |
| EP | 2072178 A1 | 6/2009 |
| FR | 1044447 A | 11/1953 |
| GB | 2224751 A | 5/1990 |
| JP | 58-132394 A | 8/1983 |
| JP | 58-159995 A | 9/1983 |
| JP | 59-137792 A | 8/1984 |
| JP | 61-99569 A | 5/1986 |
| JP | 1-166900 A | 6/1989 |
| JP | 01202396 | 8/1989 |
| JP | 2-284766 A | 11/1990 |
| JP | 6-198487 A | 7/1994 |
| JP | 6-344179 A | 12/1994 |
| JP | 7-9123 A | 1/1995 |
| JP | 8-303988 A | 11/1996 |
| JP | 10-193086 A | 7/1998 |
| JP | 2007-175746 A | 7/2007 |
| JP | 2008-168332 A | 7/2008 |
| KR | 2000-0047330 A | 7/2000 |
| KR | 2004-0098812 A | 11/2004 |
| KR | 2008-0089932 A | 10/2008 |
| RU | 2333082 C2 | 9/2008 |
| WO | WO 2005092563 A2 | 10/2005 |
| WO | WO 2005123309 A1 | 12/2005 |
| WO | WO 2006100054 A1 | 9/2006 |
| WO | WO 2010060869 A1 | 6/2010 |

OTHER PUBLICATIONS

U.S. Appl. No. 13/130,502, Andreas Becker, et al, filed May 20, 2011.
Yang, B., et al—"Effect of Fluoride on Corrosion of Cooling System Metals in Ethylene Glycol-Based Antifreeze/Coolants", 2006, Journal of ASTM International (JAI), vol. 3, Issue No. 10, Paper ID JA1100505, pp. 1-10; 10 pgs.
Chen, Rong, et al—"Phase Diagram of the System KF—AlF3", 2000, Journal of the American Ceramic Society, vol. 83, Issue No. 12, pp. 3196-3198; 3 pgs.

* cited by examiner

*Primary Examiner* — Weiping Zhu

(57) ABSTRACT

Aluminum parts, e.g., heat exchangers, with improved resistance towards corrosion caused by contact with stationary water or aqueous compositions such as cooling water can be obtained by addition of Li compounds in specific amounts to the flux used for brazing the parts. LiF and especially Li fluoroaluminates are very suitable. The flux and the Li salt can be dispersed in water or an aqueous composition separately.

9 Claims, No Drawings

FLUX FORMING AN INSOLUBLE BRAZING RESIDUE

CROSS-REFERENCE TO RELATED APPLICATIONS

This application is a U.S. national stage entry under 35 U.S.C. §371 of International Application No. PCT/EP2010/051626 filed Feb. 10, 2010.

TECHNICAL FIELD OF THE INVENTION

The invention concerns a flux for brazing of aluminum which forms a brazing residue with very low solubility in water, a process for brazing and brazed aluminum parts obtained when using the flux.

BACKGROUND OF THE INVENTION

It is well known in the art that brazing of aluminum parts can be performed utilizing fluxes based on alkali metal fluoroaluminates. Fluxes of this type are generally considered to be noncorrosive. See for example, U.S. Pat. No. 3,971,501 which applies a flux based on $KAlF_4$ and $K_3AlF_6$, or U.S. Pat. No. 4,689,092 which applies a flux based on potassium fluoroaluminate and cesium fluoroaluminate. U.S. Pat. No. 6,949,300 discloses kinetic spraying onto metal substrates a brazing composition that comprises corrosion protector, brazing filler and/or non-corrosive flux.

EP-A-0 091231 discloses a flux comprising LiF in an amount of from 2% by weight to 7% by weight. The flux has a lowered melting point and is said to be suitable for brazing of aluminum alloys containing magnesium. In two examples, items were brazed with a flux containing $K_3AlF_6$, $KAlF_4$ and $Li_3AlF_6$. The brazed items were subjected to a brine test and showed no corrosion after a treatment of 1000 hours.

In GB-A 2 224 751, a method of treating an aluminum workpiece is described. A treatment of the workpiece with a carbon oxide, e.g., during brazing, is provided. Hereby, the workpiece blackens. The formation of a black coating is improved when LiF is present in the flux.

JP 07-009123 discloses a flux with a melting point of 560° C. or less which is suitable for brazing of aluminum alloys containing magnesium. In two examples, fluxes with 3 and 10% by of LiF, respectively, were applied.

U.S. Pat. No. 5,802,752 discloses a method for open-air flame brazing (torch brazing). A flux is applied which contains a potassium fluoroaluminate flux and from 1 to 30% by weight, most preferably from 6 to 11% by weight, of cesium fluoride, lithium fluoride or both. The flux is well suited to braze aluminum alloys containing magnesium.

EP-A-0 347 106 discloses a method for treating aluminum workpieces by heating them in an oxidizing atmosphere to improve their corrosion resistance. In some of the examples, among other inorganic additives, LiCl, $Li_3AlF_6$ or LiF are added in an amount of 4.8% by weight. The effect is enhanced when additives such as alkali and alkaline earth metal salts are added to the flux.

EP-A-0 541 259 discloses a flux comprising $KF-AlF_3$ and, in an amount of 0.75 to 16.5% by weight of LiF. The flux is obtained by melting appropriate amounts of KF, LiF and $AlF_3$ in a crucible. The brazed parts, when immersed in water, provide a relatively low conductivity to the water.

If contacted for extended times with water or aqueous liquids, aluminum parts brazed with potassium fluoroaluminate based fluxes show signs of corrosion. This is disclosed by Bo Yang et al. in Journal of ASTM International, Vol. 3, Issue 10 (2006). The corrosion can be recognized by the appearance of turbidity in the water or liquid and seems, for example, to induce the formation of aluminum hydroxide.

This corrosion seems to be caused by fluoride ions which are leached from brazing residues if the brazed parts are in contact with water for extended periods of time, e.g., for at least one day or longer.

It is known that aluminum is always coated by aluminum oxide which prevents a good braze joint; the purpose of adding a flux is to clean the surface of the aluminum parts to be brazed, and notably, to remove the oxide layer. Often, potassium fluoroaluminate based fluxes are applied. Often, these fluxes consist of $KAlF_4$ or of a mixture of $KAlF_4$ and $K_2AlF_5$. The content of $K_3AlF_6$ in the flux should be low. During the brazing process, $K_3AlF_6$ is often formed, and these fluxes can be considered as precursor for $K_3AlF_6$. It is assumed that $K_2AlF_5$ disproportionate to $KAlF_4$ and $K_3AlF_6$ according to the following equation:

$$2K_2AlF_5 \rightarrow KAlF_4 \text{ and } K_3AlF_6 \quad (1)$$

Other fluxes, e.g., potassium fluorozincate, form potassium fluoroaluminates in situ:

$$2Al + 3KZnF_3 \rightarrow 3Zn + KAlF_4 + K_2AlF_5 \quad (2)$$

The $K_2AlF_5$ formed will disproportionate according to equation (1) forming $KAlF_4$ and $K_3AlF_6$. Thus, such fluxes are precursors of $K_2AlF_5$ and $K_3AlF_6$, and the overall equation is $$4Al + 6KZnF_3 \rightarrow 6Zn + 3KAlF_4 + K_3AlF_6 \quad (2a)$$

$K_2SiF_6$ forms $K_2AlF_5$, and, see (3b), subsequently $K_3AlF_6$, too:

$$4Al + 3K_2SiF_6 \rightarrow 3Si + 2KAlF_4 + 2K_2AlF_5 \quad (3)$$

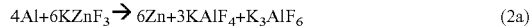

$$4Al + 3K_2SiF_6 \rightarrow 3Si + 3KAlF_4 + K_3AlF_6 \quad (3b)$$

The $K_2AlF_5$ formed will disproportionate, as described above, to form $KAlF_4$ and $K_3AlF_6$. Also potassium fluorostannates are precursors of $K_2AlF_5$ and $K_3AlF_6$.

It was found that in prolonged contact with water, $K_3AlF_6$ releases KF which causes corrosion on the surface of the brazed aluminum parts.

SUMMARY OF THE INVENTION

Object of the present invention is to provide an improved flux which provides brazed aluminum parts with improved anticorrosive properties, especially after contact with water. A further object is to provide a brazing process wherein the novel flux is applied. Still another object is to provide brazed aluminum parts with improved protection against corrosion, especially when contacted with water.

It was found that, when lithium salts are added in specific amounts to fluxes for aluminum brazing, $K_2LiAlF_6$ is formed instead of $K_3AlF_6$ in the brazing residue. $K_2LiAlF_6$ is much less soluble than $K_3AlF_6$ when contacted with stationary water. Such contact with stationary water occurs for example when brazed parts are stored in the open air.

DETAILED DESCRIPTION

In the context of the present invention, the term "comprising" is intended to include the meaning of "consisting of".

According to one aspect, the invention concerns a modified flux for aluminum brazing which provides brazing residues with low solubility in water. The modified flux of the invention is suitable for aluminum brazing and contains a basic flux which comprises $K_2AlF_5$ or a precursor thereof, and a Li salt in an amount which corresponds to from 80% to 120% of the amount which is stoichiometrically needed to convert all $K_2AlF_5$ to $K_2LiAlF_6$ during brazing.

The term "basic" does not refer to the meaning "pH above 7" but refers to the meaning "principal". It is preferred that the molar ratio of the Li salt and $K_2AlF_5$ present in the flux or formed from the precursor is from 0.8:1 to 1.2:1 for Li salts of type LiA, from 0.4:1 to 0.6:1 for Li salts of type $Li_2B$, and from 0.25:1 to 0.4:1 for Li salts of type $Li_3C$. The preferred ranges are from 0.9:1 to 1.1:1 for Li salts of type LiA, from 0.5:1 to 0.55:1 for Li salts of type $Li_2B$, and from v0.3:1 to 0.36:1 for Li salts of type $Li_3C$. The term "Li salt of type LiA" denotes Li salts with a monovalent anion $A^-$, e.g., LiF, LiCl or Li acetate. The term "Li salt of type $Li_2B$" denotes Li salts with a divalent anion $B^{2-}$, e.g., $Li_2SO_4$, $Li_2CO_3$, or lithium oxalate. The term "Li salts of type $Li_3C$" denotes Li salts with trivalent anion $C^{3-}$. For the compound $Li_3AlF_6$, however, the ratio is different. This is because $Li_3AlF_6$ forms $K_2LiAlF_6$, too, according to the following equation (4):

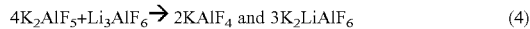

$$4K_2AlF_5 + Li_3AlF_6 \rightarrow 2KAlF_4 \text{ and } 3K_2LiAlF_6 \qquad (4)$$

Accordingly, the molar ratio between $Li_3AlF_6$ and $K_2AlF_5$ present in the flux or formed during brazing, is from 0.2:1 to 0.3:1, and preferably, it is from 0.22:1 to 0.28:1.

Especially preferred molar ratios between the Li salt and $K_2AlF_5$ present or formed are from 1:1 to 1.1:1 for Li salts of type LiA, especially for LiF, from 0.5:1 to 0.55:1 for Li salts of type $Li_2B$, from 0.33:1 to 0.36:1 for Li salts of type $Li_3C$ other than $Li_3AlF_6$, and from 0.25:1 to 0.275:1 for $Li_3AlF_6$. Preferably, the content of $K_3AlF_6$ in the basic flux is preferably equal to or lower than 2% by weight, more preferably equal to or lower than 1% by weight including 0% by weight. This content is calculated for the flux on a dry weight basis. Consequently, the content of $K_3AlF_6$ in the modified flux is of a comparable magnitude; in fact, it is slightly lower because the Li salt is included in the modified flux. Often, the content of $K_3AlF_6$ in the modified flux is preferably equal or lower than 1.99% by weight and even equal to or lower than 1.82% by weight, depending on the amount of added Li salt.

The modified flux, according to one embodiment, contains a mixture of potassium salt or salts (fluoroaluminate or fluoroaluminates, fluorozincates, or fluorosilicates) and lithium salt or salts. Such a flux can be prepared by the dry method by mixing respective salts. In another embodiment, the lithium content is homogenously distributed in the potassium salt. Such a flux can be prepared in a wet method by co-precipitation. This will be explained later.

According to one embodiment, the basic flux comprises $K_2AlF_5$. This embodiment is preferred. According to another embodiment, the basic flux comprises a precursor of $K_2AlF_5$.

In the following, basic fluxes comprising $K_2AlF_5$ are described in detail.

Preferred basic fluxes of this embodiment are selected from the group consisting of:

Basic fluxes comprising or consisting of $K_2AlF_5$.

Basic fluxes comprising or consisting of $KAlF_4$ and $K_2AlF_5$.

Basic fluxes comprising or consisting of $K_2AlF_5$, cesium fluoroaluminate and optionally $KAlF_4$.

The potassium fluoroaluminates can be present partially or completely in the form of their hydrates; e.g., $K_2AlF_5$ can be present partially or completely in the form of $K_2AlF_5 \cdot H_2O$.

It is known that $K_2AlF_5$ exists in a form which may be rehydrated, and it exists in a form which is irreversibly dehydrated. Each of the forms or a mixture of them in any desired ratio can be present in the fluxes. Details concerning their manufacture and use are given in U.S. Pat. No. 5,980,650. For example, a precipitated $K_2AlF_5$ raw product is dried in a drier at 570° C., residence time 0.5 seconds. The resulting product contains irreversibly dehydrated $K_2AlF_5$.

The term "consisting of" means that the basic flux does not contain essential amounts of other constituents, e.g., of other fluxes; preferably, the flux does not contain more than 2% by weight of other constituents, e.g., other fluxes. The content of $K_3AlF_6$ in all the fluxes of this embodiment is preferably equal to or lower than 2% by weight, more preferably equal to or lower than 1% by weight including 0% by weight. This content is calculated for the modified flux on a dry weight basis.

Basic fluxes comprising or consisting of $K_2AlF_5$ may contain $K_2AlF_5$ and/or its hydrate, $K_2AlF_5 \cdot H_2O$. The total content of $K_2AlF_5$ is preferably equal to or higher than 95% by weight. The preferred content of $K_3AlF_6$, if any, is as given above, preferably equal to or lower than 2% by weight.

Basic fluxes comprising or consisting of $KAlF_4$ and $K_2AlF_5$ will now be described in detail.

In these basic fluxes, $KAlF_4$ and $K_2AlF_5$ and, if present, their hydrates, are the main constituents. Often, the potassium fluoroaluminate consists essentially of a mixture of $KAlF_4$ and $K_2AlF_5$ or their hydrates; "essentially" denotes preferably denotes that their sum constitutes equal to or more than 95% by weight, more preferably, equal to or more than 98% by weight of the basic flux; notably, at most 2% by weight are constituted by $K_3AlF_6$ preferably equal to or less than 2% by weight, and most preferably, equal to or less than 1% by weight including 0% by weight. The weight ratio between $KAlF_4$ (including any hydrate if present) and $K_2AlF_5$ (including any hydrate if present) is very flexible. It can be from 1:99 to 99:1. Often, it is in the range of from 1:10 to 10:1. A basic flux comprising from 10 to 40% by weight of $K_2AlF_5$, $K_2AlF_5 \cdot H_2O$ or any mixtures thereof, the balance to 100% by weight being essentially $KAlF_4$ is very suitable.

In the following, basic fluxes are described comprising or consisting of $K_2AlF_5$, cesium fluoroaluminate and optionally $KAlF_4$. Basic fluxes containing potassium fluoroaluminate and cesium cations, e.g., in the form of cesium fluoroaluminate, as described in U.S. Pat. No. 4,670,067 and U.S. Pat. No. 4,689,062 are also very suitable. Those cesium-containing basic fluxes are especially suitable to braze aluminum-magnesium alloys. The weight ratio of $KAlF_4$ and $K_2AlF_5$ is preferably as described above. The Cs content is, calculated as content in CsF, between 2 and 74 mol-%. The cesium is preferably present in the form of $CsAlF_4$, $Cs_2AlF_5$, $Cs_3AlF_6$, their hydrates and any mixture of two, three or more thereof. The sum of $KAlF_4$, $K_2AlF_5$ and the cesium fluoroaluminate compound or compounds, including any hydrate, is preferably equal to or greater than 95% by weight, more preferably, equal to or more than 98% by weight. The content of $K_3AlF_6$ is preferably equal to or less than 2% by weight, and most preferably, equal to or less than 1% by weight including 0% by weight.

The flux of the present invention contains one of the basic fluxes mentioned above and an appropriate amount of a lithium salt. The mixture of the basic flux and the lithium salt is denoted "modified flux". As mentioned above, the lithium content in this modified flux depends on the content of $K_2AlF_5$ including its hydrate, if present; from 0.8 to 1.2 molar equivalents of the lithium salt with a monobasic anion are present in the modified flux per mol of $K_2AlF_5$. This will be explained further in view of LiF as lithium salt. As an example, the calculations are made for a basic flux consisting of 80% by weight of $KAlF_4$ and 20% by weight of $K_2AlF_5$. Such a flux is available from Solvay Fluor GmbH, Hannover, Germany under the trade name Nocolok®. 100 g of this flux contain 20 g $K_2AlF_5$ which corresponds to 0.1 mol since $K_2AlF_5$ has a mol weight of 200 g. Thus, the modified flux according to the invention contains 0.08 to 0.12 mol of LiF. This corresponds to about 2.08 g to 3.12 g of LiF to be added. Accordingly, the modified flux comprises 2.08 g: (100+2.08 g)=2.04% by weight to 3.12 g: (100+3.12 g)=3.0% by weight of LiF.

In the following table 1, the minimum and maximum amounts of LiF in a modified flux with varying content of $K_2AlF_5$ (in one example, $K_2AlF_5.H_2O$) are given. The modified flux including $KAlF_4$, $K_2AlF_5.H_2O$ and LiF is set as 100% by weight.

TABLE 1

Modified fluxes containing LiF

| Content of $K_2AlF_5$ in basic flux [g/100 g basic flux] | Minimal amount of LiF to be added [in g per 100 g basic flux] | Maximal amount of LiF to be added [in g per 100 g basic flux] | Minimal content of LiF in modified flux [% by weight] | Maximal content of LiF in modified flux [% by weight] |
|---|---|---|---|---|
| 5 | 0.52 | 0.78 | 0.52 | 0.77 |
| 10 | 1.04 | 1.56 | 1.02 | 1.53 |
| 15 | 1.56 | 2.34 | 1.54 | 2.3 |
| 20 | 2.08 | 3.12 | 2.04 | 3.02 |
| 25 | 2.6 | 3.9 | 2.53 | 3.75 |
| 30 | 3.12 | 4.68 | 3.03 | 4.47 |
| 35 | 3.64 | 5.46 | 3.51 | 5.18 |
| 40 | 4.16 | 6.24 | 3.99 | 5.87 |

In a preferred embodiment, the ratio of compound of type LiA, preferably LiF, and $K_2AlF_5$ in the modified flux is from 0.9:1 to 1.1:1.

Table 2 gives a compilation of modified fluxes of this preferred embodiment.

TABLE 2

Preferred modified fluxes containing LiF

| Content of $K_2AlF_5$ in basic flux [g/100 g basic flux] | Minimal amount of LiF to be added [in g per 100 g basic flux] | Maximal amount of LiF to be added [in g per 100 g basic flux] | Minimal content of LiF in modified flux [% by weight] | Maximal content of LiF in modified flux [% by weight] |
|---|---|---|---|---|
| 5 | 0.59 | 0.72 | 0.59 | 0.71 |
| 10 | 1.17 | 1.43 | 1.16 | 1.4 |
| 15 | 1.76 | 2.15 | 1.73 | 2.1 |
| 20 | 2.34 | 2.86 | 2.29 | 2.78 |
| 25 | 2.93 | 3.58 | 2.85 | 3.46 |
| 30 | 3.51 | 4.29 | 3.39 | 4.11 |
| 35 | 4.1 | 5.01 | 3.94 | 4.77 |
| 40 | 4.68 | 5.72 | 4.47 | 5.41 |

It is especially preferred if the molar ratio of compound of type LiA, preferably LiF, and $K_2AlF_5$ in the modified flux is from 1:1 to 1.1:1.

The following table 3 describes modified fluxes with $Li_3AlF_6$ added to the basic flux. The amount was calculated according to equation (4).

TABLE 3

Modified fluxes comprising added $Li_3AlF_6$

| Content of $K_2AlF_5$ in basic flux [g/100 g basic flux] | Minimal amount of $Li_3AlF_6$ to be added [in g per 100 g basic flux] | Maximal amount of $Li_3AlF_6$ to be added [in g per 100 g basic flux] | Minimal content of $Li_3AlF_6$ in modified flux [% by weight] | Maximal content of $Li_3AlF_6$ in modified flux [% by weight] |
|---|---|---|---|---|
| 5 | 0.81 | 1.22 | 0.8 | 1.21 |
| 10 | 1.62 | 2.43 | 1.6 | 2.37 |
| 15 | 2.43 | 3.65 | 2.37 | 3.52 |
| 20 | 3.24 | 4.86 | 3.14 | 4.63 |
| 25 | 4.05 | 6.08 | 3.89 | 5.73 |
| 30 | 4.86 | 7.29 | 4.63 | 6.79 |
| 35 | 5.67 | 8.51 | 5.37 | 7.84 |
| 40 | 6.48 | 9.72 | 6.09 | 8.86 |

According to another embodiment, the basic flux, and thus, the modified flux, comprises a precursor of $K_2AlF_5$. Preferred precursors are potassium fluorozincates and $K_2SiF_6$. $KZnF_3$ is a basic flux which is a precursor of $K_2AlF_5$ and thus, $K_3AlF_6$, respectively. It forms $K_2AlF_5$ according to equation (2) as stated above. The addition of Li salts prevents the formation of $K_3AlF_6$ from this compound, as demonstrated for LiF addition:

$$2Al+3KZnF_3+LiF \rightarrow 3Zn+KAlF_4+K_2LiAlF_6 \qquad (5)$$

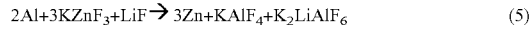

Since the Mol weight of $KZnF_3$ is 161.4, and from 0.8 to 1.2 mol of monobasic Li salt are applied per mol of $K_2AlF_5$ formed, about 4.3 g to 6.5 g LiF (or respective amounts of other Li salts with monobasic anions) are added per 100 g of $KZnF_3$ to the basic flux. Consequently, the modified flux comprises about from 4% to 6.1% by weight of LiF or any other Li salt with monobasic anions.

The amount of $Li_3AlF_6$ can be calculated from equation (6):

$$8Al+12KZnF_3+Li_3AlF_6 \rightarrow 12Zn+6KAlF_4+3K_2LiAlF_6 \qquad (6)$$

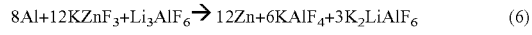

Per 100 g of $KZnF_3$, about from 6.5 g to 10 g of $Li_3AlF_6$ are added. Accordingly, very little Li salt is needed to reduce the corrosive influence of cooling water or stationary water on items brazed with the potassium fluorozincate flux. The modified flux comprises from 6.1 to 9.1% by weight of $Li_3AlF_6$.

In these calculations, it is assumed that the flux consists of the Li salt and $KZnF_3$. The expert can easily recalculate the amounts of Li salt to be added to the basic flux if the basic flux contains additives. For example, if the basic flux consists of 70% by weight of $KZnF_3$ and 30% by weight of silicon, the amount of LiF to be added would be 4.0.7 g=2.8 g to 6.5.0.7 g=4.6 g; consequently, the modified flux contains from 2.7 g to 4.4% by weight of LiF. The amount of $Li_3AlF_6$ would be from 4.6 g to 7 g, and the modified flux contains from 4.4 to 6.5 g of $Li_3AlF_6$. It was found, however, that the anticorrosive effect of the Li salts was better for basic fluxes of the potassium fluoroaluminate type described above.

Accordingly, preferred modified fluxes comprise $K_2AlF_5$ and from 10.5 g to 15.5 g of LiF or from 16.2 g to 24.3 g $Li_3AlF_6$ per 100 g of $K_2AlF_5$. Especially preferred modified fluxes comprise from 11.7 g to 14.3 g of LiF or from 18.2 g to 22.3 g $Li_3AlF_6$ per 100 g of $K_2AlF_5$.

Alternatively, fluxes comprise $KZnF_3$ and from 4.3 g to 6.5 g LiF or from 6.5 g to 10 g of $Li_3AlF_6$ per 100 g of $KZnF_3$. Fluxes often comprise $KZnF_3$ from 4.8 g to 6 g LiF or from 7.3 g to 9.2 g of $Li_3AlF_6$ per 100 g of $KZnF_3$.

The basic fluxes which can be modified by the addition of Li salts, as well as their manufacture are known and often are commercially available. Basic fluxes based on potassium fluoroaluminate are for example described in U.S. Pat. No. 3,951,328, U.S. Pat. No. 4,579,605, and U.S. Pat. No. 6,221,129. Basic flux precursors, especially potassium hexafluorosilicate, can also be used.

Alkali metal fluorozincate basic fluxes are disclosed, for example, in U.S. Pat. Nos. 6,432,221 and 6,743,409.

The fluxes optionally contain brazing metal precursors, especially Si. The particle size of Si is preferably equal to or lower than 30 μm.

If desired, the different powders of basic flux, lithium salt and any additive, if used, can be mixed and/or milled to obtain a more homogenous modified flux or a modified flux with smaller particle size.

The preferred flux essentially contains or consists of potassium fluoroaluminate, notably $K_2AlF_5$ or a mixture of $KAlF_4$ and $K_2AlF_5$, or of potassium fluorozincate, and one of LiF and $Li_3AlF_6$ in the amounts relative to $K_2AlF_5$ contained in the flux or formed during brazing as outlined above.

$Li_3AlF_6$, LiF and other Li salts, e.g., LiOH or $Li_2CO_3$, are commercially available. While inorganic basic Li compounds, for example, LiOH or $Li_2CO_3$, are very suitable in the wet process, as described in U.S. Pat. No. 4,428,920, other Li compounds, e.g., LiF, might be used, optionally together with the basic Li compounds mentioned above. Fluoroaluminum acid can be produced from aluminum hydroxide and HF in the respective stoichiometric amounts. $Li_3AlF_6$ is available from Solvay Fluor GmbH, Hannover, Germany.

The manufacture of potassium fluoroaluminate fluxes with varying contents of $KAlF_4$ and $K_2AlF_5$ is described in U.S. Pat. No. 4,579,605. Aluminum hydroxide, hydrofluoric acid and a potassium compound, e.g., KOH dissolved in water, are reacted. The patent discloses that by applying the starting materials in specific molar ratios and concentrations and maintaining specific reaction temperatures, the content of $KAlF_4$ and $K_2AlF_5$ in the resulting flux mixture can be pre-determined.

The Li cations can be introduced into the modified flux in two principal ways the wet method and the dry method. According to the wet method, the modified fluxes are prepared in methods including at least one precipitation step. For example, potassium lithium fluoroaluminates can be prepared by reacting aluminum hydroxide with HF to form fluoroluminum acid which in turn is then reacted with potassium hydroxide in the presence of Li salts, for example, LiF, $Li_3AlF_6$, LiOH, Li oxalate or $Li_2CO_3$ (or even Li metal—but there would be a risk due to the formation of $H_2$) so that potassium fluoroaluminate precipitates which contains Li cations. The advantage is a rather homogenous distribution of the Li content in the formed precipitate.

Alternatively, the modified flux can be prepared in a dry method by mechanically mixing the basic flux and the Li salt in desired ratios. Also here, generally, organic and inorganic Li compounds appear suitable. Preferably, fluorine containing Li compounds, if desired in the form of mixtures of two or more such compounds, are used as source for Li cations. It is possible to apply compounds which contain only Li cations. For example, compounds or mixtures of compounds can be applied which contain Li cations and other alkali metal cations, preferably K and/or Cs cations. Often, LiF or lithium fluoroaluminate are used as source for Li cations.

The modified flux, be it obtained by the wet method or the dry method, is principally applicable for brazing in the same manner as the basic flux. It can be applied as such, e.g., as dry flux electrostatically or by plasma spraying. It also can be applied in a wet fluxing method. Details are given below when the aspect of the present invention concerning a brazing method is explained in detail below.

As mentioned above, the modified fluxes improve the anticorrosive properties of parts brazed with it. It is recognized in the art that especially fluoroaluminate fluxes are basically non-corrosive towards aluminum or aluminum alloys. Nevertheless, under certain circumstances—long contact with water, especially stationary water, or aqueous liquids like cooling liquid (cooling water)—corrosion appears to occur. This can be recognized by a white precipitate (assumed to be aluminum hydroxide) which can be found in the water or aqueous liquid.

Thus, the modified fluxes are applied to improve the resistance of aluminum parts which, after brazing, are subjected to an additional step of being in contact with water, or aqueous compositions, especially stationary water like rain water or cooling water, for an extended period of time. This results often in fluoride leaching. The term "extended periods of time" denotes a period of contact which lasts at least one day, preferably at least 2 days. The term "extended period of time" has no specific upper limit. It may last for one week or longer. In the case of water containing cooling liquid, for example, the contact between the liquid and aluminum can last for years, e.g., equal to or lower than 1 year, equal to or lower than 2 years, and even equal to or lower than 5 years.

In the present invention, the term "caused by fluoride ions" is used. The reason is that the greatest corrosive influence is allocated to the fluoride ion. It is considered possible that other species originating from the dissolution of the flux residue may have corrosive properties. Thus, the term "caused by fluoride ions" does not exclude the possibility that corrosion is caused by other species present in the water or aqueous solution or by other chemical mechanisms.

The term "water" includes water from natural sources, e.g., rain water, water formed as dew, and water formed after snow melt. It includes artificial water sources, e.g., tap water. The term "water" is also meant to include aqueous compositions. The term "aqueous compositions" in its broadest sense includes any composition which contains water and at least one additional component, e.g., an inorganic or organic salt, and often, liquid components, for example, an organic liquid, e.g., a monobasic or dibasic alcohol, and comes into contact with brazed aluminum parts. It includes, for example, cooling liquid which, besides water, usually additionally contains antifreeze compounds, especially glycol, and additives, for example, anticorrosive or colorant, such as those used in coolers for stationary refrigeration equipment or stationary heat exchangers or in cooling water for vehicles. Preferably, the term "water" denotes rain water; water formed from snow or dew; and the term "aqueous compositions" preferably denotes cooling water in combustion engines.

In one embodiment of this aspect of the invention, the aluminum parts which are rendered more resistant towards corrosion by applying a $Li^+$ modified flux are post-treated by a heat treatment with oxygen, or oxygen contained in air or in inert gases, e.g., in mixtures containing oxygen and argon and/or nitrogen, after brazing. It was observed that fluoride leached out of the flux residues after extended periods of time of contact of the aluminum parts with water has less corrosive impact on the brazed parts compared to brazed parts without heat treatment in air or said oxygen-containing gases.

In this embodiment, the brazed parts are subjected to a heat treatment in an oxygen containing atmosphere. Preferably, the temperature during heat treatment is equal to or higher than 400° C. Preferably, it is equal to or lower than 530° C. If desired, the temperature may be higher. A preferred oxygen containing atmosphere is air.

The duration of the heat treatment is preferably equal to or longer than 10 seconds, especially preferably equal to or longer than 30 seconds. It is preferably equal to or shorter than 1 hour, especially equal to or shorter than 15 minutes.

An oxidizing heat treatment to improve corrosion resistance is already known from EP-A-0 034706. However, it is not clear from the description of said EP application relative to which kind of corrosion or corrosion caused by what corrosive agent the treated aluminum parts might be protected. A reference to the examples indicates that the protection is intended against corrosion caused by salt water. Said EP application is not addressing problems caused by fluoride ions leached from the flux after contact with water for an extended period of time, for example, for one day or longer.

According to another embodiment, no additional treatment of the parts in oxygen or in an atmosphere containing oxygen is performed. Preferably, the use of the modified flux of the invention is the only anticorrosive treatment of the brazed parts.

In a preferred embodiment, the terms "water" and "aqueous composition" in the frame of the present invention do not include salt water, especially salt water according to the AST-GM43 SWAT test.

The modified flux can be used for brazing in the same manner known to the expert in view of the basic fluxes. The modified fluxes mentioned above can, for example, be used per se as dry powder, optionally together with additives, e.g., by electrostatic application. The modified fluxes mentioned above can, for example, be applied to the aluminum parts in a wet method, optionally together with additives. In the following, suitable additives are described in more detail.

There are two main categories of additives: brazing additives that improve or modify the joint between the brazed parts, e.g., improve the brazing of Al—Mg alloys or improve generally the surface properties of the joint, and fluxing additives which modify or improve the way of fluxing the parts to be joined. Useful additives will now be explained in some detail.

In the following paragraphs, brazing additives improving or modifying the brazing are explained, in view of modified potassium fluoroaluminate which is the preferred example of a basic flux.

In one embodiment, the modified flux further contains at least one magnesium compatibilizing agent selected from the group consisting of cesium fluoroaluminates, cesium fluorozincates and potassium fluorozincates. Such a flux is also suitable to braze aluminum alloys with a content of equal to or more than 0.5% by weight of magnesium. The content of the magnesium compatibilizing agent is preferably equal to or greater than 0.5% by weight of the flux, i.e. of the sum of potassium fluoroaluminate, LiF or lithium fluoroaluminate, and the magnesium compatibilizing agent. Preferably, it is equal to or lower than 20% by weight of the flux.

The flux may additionally be modified by metal salts of metals of the main group or sub groups of the periodic system of the elements, for example, halides, nitrates, carbonates or oxides of zirconium, niobium, lanthanum, yttrium, cerium, titanium, strontium, indium, tin, antimony, or bismuth as described in US patent application publication 2007-0277908. These additives can be contained preferably in an amount of equal to or less than 3% by weight of the total dry weight of the flux.

The flux may also comprise brazing (filler) metal, e.g., Al—Si alloys, or brazing metal precursors, for example, silicon, copper or germanium as described in U.S. Pat. No. 5,100,048. The brazing metal precursors, if present in the flux, are contained preferably in an amount of from 2 to 30% by weight of the total flux.

Another flux suitable for aluminum brazing contains potassium fluorozincate, the compound containing the Li cation, and optionally Si. Also here, if contained, the Si is preferably present in an amount of from 2 to 30% by weight of the total flux.

If desired, fluxes with specific particle sizes can be selected for specific methods of application. For example, the particles including any brazing additives, may have the particle size distribution as disclosed in U.S. Pat. No. 6,733,598 and are especially suitable for application according to the dry method, e.g., by electrostatic power.

The particles of the flux may be of a coarser nature than the finer particles disclosed in said U.S. Pat. No. 6,733,598. Such coarser fluxes are very suitable for the application in the form of a flux composition including the flux dispersed a solvent; they can, for example, be applied by painting, printing or spraying onto the parts.

The flux, optionally including modifying metal salts or magnesium compatibilizing agents, for example, those described above, can be applied as such, with or without additives, as dry powder, for example, electrostatically or by applying a low temperature plasma, as described in WO 2006/100054. In this plasma process, finely divided flux powder is partially molten by a low temperature plasma beam and sprayed onto the surface of the aluminum parts to be joined.

The modified flux with or without one or more of the brazing additives mentioned above can also be applied according to the wet method in the form of a flux composition. Here, the flux composition comprises the modified flux, optionally containing one or more of said brazing additives and/or fluxing additives.

A flux composition for wet application which contains the flux described above is another embodiment of the present invention. This flux composition (and thus also the method of brazing according to the present invention where the flux composition can be applied) will now be explained in detail.

The flux composition of the present invention suitable for the wet fluxing method contains the modified flux, optionally including one or more of the brazing additives, and at least one of the fluxing additives selected from the group consisting of solvents, binders, thickeners, suspension stabilizers, antifoaming agents, surfactants, and thixotropic agents.

In one preferred embodiment, the flux composition contains the flux suspended in the solvent, especially in water, water-free organic liquids or aqueous organic liquids. Preferred liquids are those that have a boiling point at ambient pressure (1 bar abs) of equal to or lower than 350° C. The term "suspended in water" does not exclude that a part of the flux composition is dissolved in the liquid; this may be the case especially when water or aqueous organic liquids are contained. Liquids that are preferred are deionized water, mono-, di- or tribasic aliphatic alcohols, especially those with 1 to 4 carbon atoms, e.g., methanol, ethanol, isopropanol, or ethylene glycol, or glycol alkyl ethers, wherein alkyl preferably denotes linear or branched aliphatic C1 to C4 alkyl. Non-limiting examples are glycol monoalkyl ethers, e.g., 2-methoxyethanol or diethylene glycol, or glycol dialkylethers, for example, dimethyl glycol (dimethoxyethane). Mixtures comprising two or more of the liquids are also suited very well. Isopropanol or mixtures containing isopropanol are especially suitable.

The composition comprising the flux suspended in a liquid may also contain further fluxing additives, for example, thickener, surfactants or thixotropic agents.

In an especially preferred embodiment the flux is present in the form of a flux composition wherein the flux is suspended in a liquid which also contains a binder. Binders improve, for example, the adhesion of the flux mixture after their application on the parts to be brazed. Thus, the wet flux method using a flux composition comprising flux, binder and water, organic liquid or aqueous organic liquid is a preferred embodiment of the brazing process of the present invention.

Suitable binders can be selected for example from the group consisting of organic polymers. Such polymers are physically drying (i.e., they form a solid coating after the liquid is removed), or they are chemically drying (they may form a solid coating e.g., under the influence of chemicals, e.g., oxygen or light which causes a cross linking of the molecules), or both. Suitable polymers include polyolefins, e.g., butyl rubbers, polyurethanes, resins, phthalates, polyacrylates, polymethacrylates, vinyl resins, epoxy resins, nitrocellulose, polyvinyl acetates, or polyvinyl alcohols. Flux compositions containing water as liquid and water-soluble polymers, for example, polyurethane, or polyvinyl alcohol as binder are especially suitable because they have the advantage that, during the brazing process, water is evaporated instead of possibly flammable organic liquids.

The compositions may include other additives which improve the properties of the composition, for example, suspension stabilizers, surfactants, especially nonionic surfactants, e.g., Antarox BL 225, a mixture of linear C8 to C10 ethoxylated and propoxylated alcohols, thickeners, e.g., methyl butyl ether, thixotropic agents, e.g., gelatin or pectins, or a wax as described in EP-A 1808264.

The content of the modified flux (including basic flux, Li containing additive and, if present, other additives, e.g., filler metal, filler precursor, additives, e.g., metal salts, improving the brazing or surfaces properties) in the total composition (including liquid or liquids, thixotropic agents, surfactants and binders, if present) generally is equal to or greater than 0.75% by weight. Preferably, it is equal to or greater than 1% by weight. More preferably, the flux content in the composition is equal to or greater than 5% by weight, very preferably, equal to or greater than 10% by weight of the total flux composition.

Generally, the content of the modified flux in the composition is equal to or lower than 70% by weight. Preferably, it is equal to or lower than 50% by weight.

The binder, if present, is generally contained in an amount of equal to or greater than 0.1% by weight, preferably equal to or greater than 1% by weight of the total flux composition. The binder, if present, is generally contained in an amount equal to or lower than 30% by weight, preferably equal to or lower than 25% by weight of the total composition.

The thixotropic agent, if present, is generally contained in an amount of equal to or greater than 1% by weight of the total flux composition. Generally, if present, it is contained in an amount equal to or lower than 20% by weight, preferably equal to or lower than 10% by weight.

The thickener, if present, is generally contained in an amount of equal to or greater than 1% by weight, preferably equal to or greater than 5% by weight of the total flux composition. Generally, the thickener, if present, is contained in an amount equal to or lower than 15% by weight, preferably equal to or lower than 10% by weight of the total composition.

Highly suitable flux compositions for wet applications contain from 10 to 70% by weight of the flux (including filler metal, filler precursor, modifying and anticorrosive agents, e.g., metal salts, improving the brazing or surfaces properties), from 1 to 25% by weight binder, from 0 to 15% by weight of a thickener, from 0 to 10% by weight of a thixotropic agent, and from 0 to 5% by weight of other additives, e.g., a surfactant or a suspension stabilizer. Preferably, the reminder to 100% by weight is water, an organic solvent or an aqueous organic solvent.

In one specific embodiment, the flux composition is free of any water or water-free or aqueous organic liquid, but contains the flux (and optionally one or more of the filler metal or precursor, modifying or anticorrosive agents which improve the brazing process or the properties of the brazed product or other additives, e.g those described above) as described above, and a water-soluble organic polymer as a binder which is present in the form of a water soluble package for the flux. For example, polyvinyl alcohol is very suitable as water-soluble package for the flux as described in US patent application publication 2006/0231162. Such packages can be handled without dust formation, and after addition of water, they form a suspension in water including a flux and the water soluble polymer as binder.

The content of Li salt relative to the $K_2AlF_5$ present or formed during brazing is not affected by the additives, with the exception of $K_2SiF_6$ which forms $K_2AlF_5$ during brazing and thus must be considered in the calculation of the amount of Li salt needed.

If the solvent is water or contains water and an organic liquid, e.g., an alcohol, it is preferred to apply Li salts with low solubility in water, e.g., compounds with a solubility of 0.5 g or less in water at 20° C.; LiF and $Li_3AlF_6$ are very suitable here, too.

Another aspect of the present invention is the provision of a process for brazing aluminum parts comprising a step wherein the modified flux or the composition containing the modified flux is applied to a part of the surface (including those parts of the surface which will be joined during brazing) or the entire surface of the parts to be brazed. After fluxing, these parts are assembled and brazed, or, alternatively, the parts to be brazed are assembled, then fluxed and then brazed. In one alternative, the brazed parts are subjected to an oxidative heat treatment after brazing; in another alternative, they are not subjected to an oxidative heat treatment.

The flux can be applied according to the dry fluxing method described above. The wet flux compositions can alternatively be applied to the aluminum parts according to methods known in the art. For example, they can be sprayed onto the surface thus forming coated aluminum parts; alternatively, they can be applied by immersing the aluminum parts to be coated into the flux composition; or by painting or printing the flux composition onto the aluminum parts to be brazed thus forming coated parts. It has to be kept in mind that the term "aluminum" includes aluminum alloys, especially magnesium containing alloys. The liquid-free flux composition containing flux, water-soluble binder and optionally further additives in the form of a package can be put into water before use to form an aqueous flux composition containing suspended flux mixture and dissolved binder.

Generally, the parts coated with the wet flux composition are dried (this is of course not necessary in parts coated according to the dry method unless applies fluoroaluminate hydrates and wants to remove crystal water before starting the brazing process). Drying can be performed independently from brazing; the dried flux-coated parts can then be stored until they are brazed. Alternatively, drying can be performed directly in the brazing apparatus or in a separate drying apparatus just before the brazing operation.

A process for brazing of parts made from aluminum or aluminum alloys wherein the modified flux according to the invention or a flux composition comprising the modified flux and additives is coated on at least one of the parts to be brazed, and the parts are heated to a temperature sufficiently high to braze the parts.

For brazing, the coated parts to be joined by brazing are assembled (before or after drying if coated according to a wet process) and heated to from about 560° C. to about 610° C. This can be done in an inert gas atmosphere, e.g., in a nitrogen or argon atmosphere. It is also possible to braze in open air (torch brazing).

It was found that parts of aluminum which are brazed with the flux of the invention which contains lithium fluoroaluminate generally are very resistant to corrosion.

A further aspect of the present invention concerns aluminum parts or aluminum alloy parts, coated with the modified flux of the present invention. These parts preferably are parts used to produce heat exchangers, e.g., tubes and fins, in coolers or air conditioning systems of cars or lorries, or for producing "HVAC" apparatus. HVAC means heating, ventilation, air conditioning—the technology of indoor environmental comfort.

Another aspect of the present invention concerns assembled parts of aluminum or aluminum alloys brazed using a flux or flux composition according to the present invention. These parts are, preferably, parts used in transferring heat from one medium to another medium. Preferably, these parts are used in heat exchangers or cooling systems of cars and lorries and in HVAC apparatus.

In the international patent application PCT/EP2009/065566 which was filed by the applicant earlier and which is published as WO2010/060869, certain compositions of a Li-modified flux are already described. In one embodiment of the invention, modified fluxes, compositions, respective coated parts, brazing processes using the fluxes or flux compositions and brazed parts obtained as disclosed in said PCT/EP2009/065566 are disclaimed if legally necessary. For example, the following mixtures are disclosed therein: in table 1, a modified flux consisting of 3% by weight, 3.7% by weight and 4% by weight of $Li_3AlF_6$, the balance to 100% by weight being Nocolok®, a modified flux consisting of about 80% by weight of $KAlF_4$ and about 20% by weight of $K_2AlF_5$; a modified flux consisting of 66% by weight of $KAlF_4$, 28% by weight of $K_2AlF_5$, and 6% by weight of $K_3AlF_6$; a modified flux consisting of 76% by weight of $KAlF_4$, 19% by weight of $K_2AlF_5$, and 5% by weight of $Li_3AlF_6$; a modified flux consisting of 66% by weight of $KAlF_4$, 28% by weight of $K_2AlF_5$, and 6% by weight of $Li_3AlF_6$; a modified flux consisting of 67% by weight of $KAlF_4$, 28% by weight of $K_2AlF_5$, and 5% by weight of $Li_3AlF_6$; a modified flux consisting of 77% by weight of $KAlF_4$, 19% by weight of $K_2AlF_5$, and 4% by weight of $Li_3AlF_6$; a modified flux comprising potassium fluoroaluminate, cesium fluoroaluminate with a ratio of K:Cs of 98:2, available as Nocolok® Cs from Solvay Fluor GmbH, and 5% by weight of $Li_3AlF_6$; a modified flux comprising 5% by weight of $Li_3AlF_6$, the balance to 100% by weight is Nocolok®; a flux consisting of 75 parts of $KZnF_3$, 25 parts of silicon powder and 5 parts of $Li_3AlF_6$; a flux containing 38% by weight of $K_2AlF_5.H_2O$, 57% by weight of $KAlF_4$ and 5% by weight of $Li_3AlF_6$; a flux contains 36.8% by weight of $K_2AlF_5.H_2O$, 55.2% by weight of $KAlF_4$ and 8% by weight of $Li_3AlF_6$; and brazing processes for some of these fluxes.

It is apparent for the expert from the description given above that the invention described provides a modified flux which can be used for aluminum brazing. Besides the advantage of rendering the brazed parts less corrosive in contact with water or aqueous compositions, the preformed modified flux has the further advantage that it can be easily applied. Even if prepared by mechanically mixing the constituents, they are fairly homogenous, throughout the stored volume. Nevertheless, if desired, especially in wet application processes, the constituents of the basic flux, optionally any additives, and the Li salt can be applied separately from each other. If desired, the basic flux and any other additives, if present, are applied pre-dispersed in the solvent. The Li salt is then added to this composition, preferably immediately before the application of the dispersion to the parts to be brazed. The advantage of this embodiment is that use can be made of any flux composition commercially available, be it a flux in dry form or already pre-dispersed in water, an organic solvent or a mixture of water and an organic solvent, and nevertheless the benefits of Li salts in view of rendering the brazed aluminum parts resistant to corrosion in contact with water or aqueous compositions are achieved. Suitable organic solvents are already mentioned above; ethanol, isopropanol and butanol are preferred solvents.

Consequently, the invention also provides a method for brazing parts of aluminum wherein a flux comprising $K_2AlF_5$ or containing a precursor of $K_2AlF_5$ which forms $K_2AlF_5$ during the brazing process for aluminum brazing, and a lithium salt with low solubility in water are dispersed in water or an aqueous solution separately from each other forming a dispersion containing the flux and the lithium salt, then at least one aluminum part is at least partially coated with the dispersion, and at least two assembled parts are brazed. The flux is preferably selected from fluxes comprising or consisting of $KZnF_3$, $K_2AlF_5$, $K_2AlF_5.H_2O$, mixtures thereof, and $K_2AlF_5$ and/or $K_2AlF_5.H_2O$ admixed with $KAlF_4$, and especially preferably from fluxes comprising or consisting of $K_2AlF_5$, $K_2AlF_5.H_2O$, mixtures thereof, and $K_2AlF_5$ and/or $K_2AlF_5.H_2O$ admixed with $KAlF_4$.

The flux and the lithium salt can be dispersed in dry form in water, the organic solvent or the aqueous organic dispersion. Additives commonly used in flux dispersions can be added. Preferred additives are selected from fluxing additives selected from the group consisting of binders, thickeners, suspension stabilizers, antifoaming agents, surfactants and thixotropic agents. Preferred solvents, binders, thickeners and thixotropic agents are given above.

To provide the dispersion used in this invention, water, the organic solvent or the aqueous organic liquid as carrier can be brought into a container with mixing means such as a stirrer, dry flux and dry Li salt can be added in any order to the and be dispersed at the same time or consecutively. Alternatively, the flux can be added to the carrier as composition comprising additives, e.g., as a composition comprising the flux and at least one additive selected from the group consisting of binders, thickeners, suspension stabilizers, antifoaming agents, surfactants and thixotropic agents which then is added to the carrier. If desired, the flux composition itself may constitute a dispersion in a solvent. The Li salt may be added in dry form or as a dispersion in a solvent. According to still another alternative, the flux is provided in the form of a dispersion, and the Li salt is added to this dispersion. The dispersion is applied to the parts in any desired way, e.g., by painting it on the parts, by immersion of the parts, or by spraying it onto the parts.

The amount of added lithium salt is such that the content of $Li^+$ in the dispersion, based on the dry weight of the dispersion, is equal to or greater than 0.1% by weight, and equal to or lower than 4.6% by weight.

Also in this invention, due to their low solubility in water, LiF and $Li_3AlF_6$ are the preferred Li salts, especially when aqueous flux compositions or flux compositions dispersed in a mixture of water and organic solvent as carrier, are applied.

Based on the dry weight of the dispersion, the content of 0.1% by weight of $Li^+$ corresponds to a content of about 1% by weight (exactly: 0.77% by weight) of $Li_3AlF_6$ or 0.37% by weight of LiF. Preferably, the content of $Li^+$ in the modified flux is equal to or greater than 0.13% by weight.

The content of $Li^+$ can be very high. Generally, the content of $Li^+$ in the modified flux is equal to or lower than 4.6% by weight. This corresponds to a content of about 36% by weight of $Li_3AlF_6$ or 17.5% by weight of LiF in the prepared dispersion. The remainder of 64% by weight on a dry basis is constituted by the basic flux. Preferably, the content of $Li^+$ is equal to or lower than 1.3% by weight. This corresponds to a content of about 10% by weight of $Li_3AlF_6$ or about 5% by weight, on a dry basis, of LiF in the flux. More preferably, the content of $Li^+$ is lower than 1.3% by weight. Most preferably, the content of $Li^+$ in the dispersion on a dry weight basis is equal to or lower than 1.16% by weight. This corresponds to a content of about 9% by weight of $Li_3AlF_6$ or about 4.3 g of LiF.

Preferably, the content of Li salt in the dispersion is such that the molar ratio of the Li salt and $K_2AlF_5$ present in the flux or formed from the precursor is 0.8:1 to 1.2:1 for Li salts of type LiA, 0.4:1 to 0.6:1 for Li salts of type $Li_2B$, and 0.25:1 to 0.4:1 for Li salts of type $Li_3C$. The preferred ranges are 0.9:1 to 1.1:1 for Li salts of type LiA, 0.5:1 to 0.55:1 for Li salts of type $Li_2B$, and 0.3:1 to 0.36:1 for Li salts of type $Li_3C$. The term "Li salt of type LiA" denotes Li salts with a monovalent anion $A^-$, e.g., LiF, LiCl or Li acetate. The term "Li salt of type $Li_2B$" denotes Li salts with a divalent anion $B^{2-}$, e.g., $Li_2SO_4$, $Li_2CO_3$, or lithium oxalate. The term "Li salts of type $Li_3C$" denotes Li salts with trivalent anion $C^{3-}$. For the compound $Li_3AlF_6$, however, the ratio is different. The reason is given above and can be explained by the reaction equation which is $4\ K_2AlF_5 + Li_3AlF_6 \rightarrow 2\ KAlF_4$ and $3\ K_2LiAlF_6$.

Accordingly, in the dispersion, the preferred molar ratio between $Li_3AlF_6$ and $K_2AlF_5$ present in the flux or formed during brazing, is from 0.2:1 to 0.3:1, and preferably, it is from 0.22:1 to 0.28:1.

Especially preferred molar ratios between the Li salt and $K_2AlF_5$ present or formed are from 1:1 to 1.1:1 for Li salts of type LiA, from 0.5:1 to 0.55:1 for Li salts of type $Li_2B$, from 0.33:1 to 0.36:1 for Li salts of type $Li_3C$, and from 0.25:1 to 0.275:1 for $Li_3AlF_6$. Preferably, the content of $K_3AlF_6$ in the basic flux is preferably equal to or lower than 2% by weight, more preferably equal to or lower than 1% by weight including 0% by weight. This content is calculated for the dispersion on a dry weight basis. Consequently, the content of $K_3AlF_6$ in the modified flux is of a comparable magnitude; in fact, it is slightly lower because the Li salt included in the modified flux. Often, the content of $K_3AlF_6$ in the modified flux is preferably equal or lower than 1.99% by weight and even equal to or lower than 1.82% by weight, depending on the amount of added Li salt.

Tables 1, 2 and 3 help the expert to understand this invention and to realize how much of the Li salt he should add, according to the columns indicating the amount of Li salt to be added. It has to be noted, though, that for this invention, the ranges of tables 1, 2 and 3 refer to preferred embodiments.

Preferably, from 10.5 g to 15.5 g of LiF or from 16.2 g to 24.3 g $Li_3AlF_6$ are added per 100 g of $K_2AlF_5$, and especially preferably, from 11.7 g to 14.3 g of LiF or from 18.2 g to 22.3 g $Li_3AlF_6$ per 100 g of $K_2AlF_5$.

If the flux contains $KZnF_3$, preferably from 4.3 to 6.5 g LiF or from 6.5 g to 10 g of $Li_3AlF_6$ are added per 100 g of $KZnF_3$, and especially preferably from 4.8 g to 6 g LiF or from 7.3 g to 9.2 g of $Li_3AlF_6$ per 100 g of $KZnF_3$.

Thus, if he wishes, the expert could apply more or less of the Li salt than given by the ranges above. But if the ratio is lower, the anticorrosive effect may be lower than desired; if the amount is higher, the Li salt could be wasted.

For example, to perform the brazing process according to this invention, the carrier, e.g., water, an organic solvent, for example, isopropanol, or a mixture of both is given into a mixing device comprising a stirrer. The flux, for example a flux consisting of 80% by weight of $KAlF_4$ and 20% by weight of $K_2AlF_5$ is added to the carrier. Optionally, the resulting composition can be stirred. Then, or alternatively, before the addition of the flux, a Li salt is added, e.g., LiF in an amount of 2.5 g per 100 g of the flux or $Li_3AlF_6$ in an amount of 4 g per 100 g of the flux. The resulting composition is stirred, and after a desired degree of homogenization of the resulting dispersion is achieved, the dispersion can be applied for fluxing, e.g., by spraying onto the parts to be brazed. The parts are then brazed in a conventional manner, e.g., in a CAB process (controlled atmosphere brazing process). Brazing metal which is needed to form an alloy with the aluminum parts can be present as cladding on the parts.

Alternatively, a flux composition can be applied which comprises a binder, e.g., a polyacrylate binder or a polyurethane binder, and the flux consisting of 80% by weight of $KAlF_4$ and 20% by weight of $K_2AlF_5$ dispersed in water. The amount of the flux in the composition is for example 30% by weight. The dispersion is given into a mixing device containing a stirrer. LiF or $Li_3AlF_6$ is added to the stirred dispersion in an amount of, for example, 2.5 g of LiF or 4 g of $Li_3AlF_6$ per 100 g of the flux contained in the dispersion.

In still another alternative, a composition comprising a flux consisting of 80% by weight of $KAlF_4$ and 20% by weight of $K_2AlF_5$ and a binder, e.g., a polyacrylate or a polyurethane, are added, optionally under stirring, to a carrier, e.g., water, in a mixing device. Afterwards or before, LiF or $Li_3AlF_6$ is added to the stirred dispersion in an amount of, for example, 2.5 g of LiF or 4 g of $Li_3AlF_6$ per 100 g of the flux contained in the composition. The formed dispersion is stirred until the desired degree of homogeneity is achieved. Brazing of aluminum parts is then performed as described above.

Another aspect of the present invention concerns brazed aluminum parts, produced by brazing aluminum parts using the modified flux of the present invention. The brazed parts have a significant cont of Li cations in the brazing residue and demonstrate a low corrosivity when contacted with water or cooling water for extended periods of time.

The following examples are intended to explain the invention further without the intent to limit it.

EXAMPLES

General Procedure of the Dry Method:
The basic flux is mixed with the $Li^+$ containing compound and any desired other additives.

General Procedure of the Wet Method:
The flux is prepared by its precipitation in water from starting materials which comprise potassium, lithium, aluminum and fluorine and optionally other compounds, e.g., cesium compounds.

Example 1

Potassium Fluorozincate as Basic Flux and its Use 1.1. Preparation of the Flux
$KZnF_3$ (available as Nocolok® Zn Flux from Solvay Fluor GmbH, Hanover, Germany) is mixed with $Li_3AlF_6$. Per 100 g of the flux, 9 g of $Li_3AlF_6$ are added to obtain a modified flux containing 8.3 g of the Li salt.

1.2. Use of the Flux for Brazing
The modified flux of example 1.1 is mixed with water as solvent and water soluble polyurethane as binder such that the content of modified flux in the dispersion is about 25% by weight, the resulting dispersion is sprayed onto aluminum tubes clad with a brazing metal. The tubes are then dried, and tubes coated with the flux are obtained. The tubes are then assembled with aluminum fins and brazed in a known manner by heating them up to 600° C., preferably under inert gas in an oven.

1.3. Separate Addition of the Basic Flux and the Lithium Salt
$KZnF_3$ (available as Nocolok® Zn Flux from Solvay Fluor GmbH, Hanover, Germany) is added under stirring to water in a tank provided with a stirrer. Under stirring, polyurethane binder and LiF is added to the water containing the basic flux. Per 100 g of the flux, 5.5 g of LiF are added to obtain a composition containing 5.2 g of the Li salt.

1.4. Use of the Flux for Brazing
The composition of example 1.3 is sprayed onto aluminum tubes clad with a brazing metal. The tubes are then dried, and tubes coated with the flux are obtained. The tubes are then assembled with aluminum fins and brazed in a known manner by heating them up to 600° C., preferably under inert gas in an oven.

1.5 Corrosion Test
During brazing, a Zn coating is deposited on the tubes. This Zn coating has a comparably low resistance against corrosion.

Example 2

Potassium Fluoroaluminate/Si Flux as Basic Flux 2.1. Preparation of the Modified Flux
Potassium fluoroaluminate containing Si powder as brazing metal precursor (available as Nocolok® Sil with a content of 33% by weight of Si from Solvay Fluor GmbH, Hanover, Germany) wherein the weight ratio of $KAlF_4$ and $K_2AlF_5$ is 4:1 is mixed with 4 g of $Li_3AlF_6$ per 100 g of the potassium fluoroaluminate flux to obtain a modified flux containing 3.8% by weight of $Li_3AlF_6$.

2.2. Application of the Modified Flux
The composition of example 2.1 is dispersed in a dispersion of polyurethane in water (content of polyurethane about 2% by weight of the sum of water and polyurethane) is sprayed onto aluminum tubes clad with a brazing metal. The tubes are then dried, and tubes coated with the modified flux and binder are obtained. The tubes are then assembled with aluminum fins and brazed in a known manner by heating them up to 600° C., preferably under inert gas in an oven.

Example 3

Cesium Containing Flux as Basic Flux 3.1. Preparation of the Flux Composition
A potassium fluoroaluminate flux containing cesium fluoroaluminate, available from Solvay Fluor GmbH, Hannover, Germany under Nocolok® Cs flux, with an atomic ratio of K:Cs=98:2, the weight ratio of $KAlF_4$ and $K_2AlF_5$ being 4:1, is mixed with 4.6 g of $Li_3AlF_6$ to obtain a flux containing 4.4 g of the Li salt. Water and a polyurethane binder is added such that the content of modified flux in the dispersion is about 25% by weight.

3.2. Brazing with the Flux Composition
Parts of an aluminum alloy with 0.5% by weight of magnesium are immersed in the dispersion of example 3.1 and brazed at a temperature of about 600° C.

Example 4

Flux Based on Potassium Fluoroaluminate for Dry Fluxing

A potassium fluoroaluminate flux for dry fluxing having a particle size distribution lying within the curves of figure 11 or as indicated in table B of U.S. Pat. No. 6,733,598 is used; the flux is available under the tradename Nocolok® Dryflux from Solvay Fluor GmbH, Germany.

4.1. Flux for Solderfree Brazing of Aluminum
The potassium fluoroaluminate dry flux is mixed with Si powder and $Li_3AlF_6$ such that the content of Si in the total flux is about 30% by weight; per 100 g of the potassium fluoroaluminate, 4.4 g of $Li_3AlF_6$ are added. The modified flux is applied by an electrostatic spray system to aluminum tubes which, after coating, are brazed in a known manner.

4.2. Flux for Solder-Free Brazing of Aluminum Parts with Higher Mg Content
The flux of example 4.1 is mixed with cesium tetrafluoroaluminate such that in the resulting flux mixture, the atomic ratio of K:Cs is about 98:2. The resulting flux is then applied to unclad tubes made from an aluminum alloy containing about 0.3% by weight of magnesium. Brazing of the coated tubes is then performed in a known manner by assembling the parts and heating them up to about 600° C.

Example 5

Flux High in $K_2AlF_5.H_2O$ 5.1. Preparation of the Basic Flux
A potassium fluoroaluminate flux is produced as described in example 19 of U.S. Pat. No. 4,579,605. Hydrofluoric acid with 40% by weight of HF, potassium lye with a content of 25% by weight of KOH and $Al(OH)_3$ were reacted in a molar ratio of raw material of Al:F:K=1:4:1.5. The $Al(OH)_3$ is added to the hydrofluoric acid and dissolved therein. Then, the potassium lye is added. The reaction mixture is kept at 60° C. The resulting basic flux composition contains 40% by weight of $K_2AlF_5.H_2O$ and 60% by weight of $KAlF_4$.

5.2. Modified Flux Comprising 7% by Weight of $Li_3AlF_6$
250 g of the basic flux of example 5.1 and about 19 g of $Li_3AlF_6$ are thoroughly mixed. The resulting flux contains 37% by weight of $K_2AlF_5 \cdot H_2O$, 56% by weight of $KAlF_4$ and 7% by weight of $Li_3AlF_6$.

Example 6

Flux High in Dehydrated $K_2AlF_5$ 6.1. Preparation of Dehydrated $K_2AlF_5$

A composition comprising 98.5% by weight of $K_2AlF_5 \cdot H_2O$ and 1.5% by weight of $KAlF_4$ is produced as described in example 7 of U.S. Pat. No. 4,579,605 by dissolving $Al(OH)_3$ in hydrofluoric acid containing 20% by weight of HF and reacting the resulting fluoroluminum acid with potassium lye with a content of 25% by weight of KOH (molar ratio of Al:F:K=1:4:1) at 30° C. The resulting raw product is dried in a drier at 570° C., residence time is 0.5 seconds. The resulting product is irreversibly dehydrated $K_2AlF_5$ containing minimal amounts of $KAlF_4$.

6.2 Preparation of the Basic Flux 100 g of Nocolok® flux (available from Solvay Fluor GmbH) which comprises about 20% by weight of $K_2AlF_5$, the remainder to 100% by being $KAlF_4$, is mixed with 19 g of the dehydrated $K_2AlF_5$ of example 6.1. The resulting basic flux contains about 32.5% by weight of $K_2AlF_5$ and 67.5% by weight of $KAlF_4$.

6.3. Preparation of a Modified Flux Comprising $K_2AlF_5$ 100 g of the basic flux of example 6.2 and 6.4 g of $Li_3AlF_6$ are thoroughly mixed. The resulting flux contains 6% by weight of $Li_3AlF_6$, about 30.5% by weight of $K_2AlF_5$ and 63.5% by weight of $KAlF_4$.

Example 7

Brazing with Fluxes High in $K_2AlF_5$ 7.1. Brazing with the Flux of Example 5.2

Heat exchanger sections with dimensions around 10 cm·10 cm consisting typically of tubes and fins are assembled. The flux of example 5.2 is applied onto the sections by immersing them into a slurry made of dry powderous modified flux and isopropanol (approx. 25% by weight of the modified flux in the dispersion). The specimens are weighed before and after flux loading (after drying) and so, the surface being known, the flux load is calculated. The mean value of the flux load amounts to about 6 g/m².

The specimens are brazed using a standard CAB (Controlled Atmosphere Brazing) brazing cycle in a technical furnace under nitrogen atmosphere. The resulting brazed assembly has an improved resistance towards corrosion.

Example 8

Li-Containing Flux with Low-Melting Basic Flux

The basic flux applied is Nocolok® LM (wherein LM stands for Low Melting). This flux is available from Solvay Fluor GmbH, Hannover, Germany. The basic flux contained around 40% $K_2AlF_5$ by weight (calculated based on the LOH of crystal water from $K_2AlF_5H_2O$)

Modified Flux:

11 parts of the basic flux are mechanically mixed with 1 part of with $Li_3AlF_6$. Angle-on-coupon specimens (2.5×2.5 cm²) are brazed with flux loads of 8 g/m² using the modified flux.

The brazed specimens are placed in 20 ml de-ionized water (soaking tests).

After 15 days immersion (recipients opened nearly daily to assure oxygen exchange), it is found that the aqueous phase of the assembly brazed with modified flux keeps clear. Specimens brazed with common Nocolok® LM show a cloud of precipitated material indicating corrosion.

Example 9

Preparation of Modified Flux Dispersion In Situ

Into stirred water, a binder and LiF is given. To the stirred dispersion, a flux is then added which consists of $KAlF_4$ and $K_2AlF_5$ wherein the weight ratio of $KAlF_4$ and $K_2AlF_5$ is 4:1. This flux is available as Nocolok® Flux from Solvay Fluor GmbH, Hannover, Germany. The flux is added in an amount of 100 g per 2.5 g of LiF.

The resulting dispersion is sprayed on aluminum parts. The parts are then assembled, brought into a brazing oven, heated to about 610° C. and brazed thereby.

Example 10

Preparation of Modified Flux Dispersion In Situ with High LiF Content

Example 9 is repeated. This time, 30 g of the flux are added per 2.5 g of the LiF. The concentration of LiF in the dispersion is accordingly much higher than in example 10. The parts are brazed, but some unreacted LiF remains in the brazing residue.

Example 11

Soaking Tests

Parts brazed using a modified flux consisting of $KAlF_4$ (77.6% by weight), $K_2AlF_5$ (19.4% by weight) and $Li_3AlF_6$ (3% by weight) are contacted with water for 10 days. Apparently, a part of the brazing flux residue is leached and forms a precipitate. The analysis of liquid and precipitate of the specimens brazed with the Li-modified flux and with Nocolok® a flux consisting of about 80% by weight of $KAlF_4$ and about 20% by weight of $K_2AlF_5$, will reveal that the amount of $F^-$ leached is 5 times higher or even more for the sample brazed with Nocolok®, the amount of $K^+$ is significantly higher (in the range of 100% or even more), and the $Al^{3+}$ content is about 6 times higher or even more. If the flux is applied in a wet process (by dipping the aluminum pieces to be joint into a suspension of the flux in isopropanol), the effect is still more visible than if the fluxes are applied as dry powder. It is especially remarkable that for the modified flux, no $Zn^{2+}$ is found, while in the case of Nocolok®, Zn cations in the lower ppm range can be identified.

The invention claimed is:

1. A modified flux for aluminum brazing, consisting of:
   a basic flux consisting of $K_2AlF_5$; mixtures of $KAlF_4$ and $K_2AlF_5$; mixtures of $K_2AlF_5$, cesium fluoroaluminate, and optionally $KAlF_4$; or mixtures thereof; or a precursor of $K_2AlF_5$ which forms $K_2AlF_5$ during brazing selected from the group consisting of potassium fluorozincates and $K_2SiF_6$; and
   a Li salt in an amount which corresponds to from 80% to 120% of the amount which is stoichiometrically needed to convert all $K_2AlF_5$ to $K_2LiAlF_6$ during brazing; and optionally a brazing metal or brazing metal precursor selected from the group consisting of silicon, copper and germanium; and which contains less than 1% by weight of $K_3AlF_6$.

2. The modified flux of claim 1 wherein the Li salt is selected from the group consisting of LiF and $Li_3AlF_6$.

3. The modified flux of claim 1 wherein the molar ratio of the Li salt and $K_2AlF_5$ present in the flux or formed from the precursor during brazing is from 0.8:1 to 1.2:1 for Li salts of type LiA, from 0.4:1 to 0.6:1 for Li salts of type $Li_2B$, and from 0.25:1 to 0.4:1 for Li salts of type $Li_3C$, wherein A denotes a monobasic anion, wherein B denotes a dibasic anion, and wherein C denotes a tribasic anion with the exception of the anion $AlF_6^{-3}$.

4. The modified flux of claim 1 wherein the Li salt is $Li_3AlF_6$, and wherein the molar ratio of $Li_3AlF_6$ to $K_2AlF_5$ present in the flux or formed from the precursor during brazing is from 0.2:1 to 0.3:1.

5. The modified flux of claim 1 wherein the basic flux consists of $K_2AlF_5$; mixtures of $KAlF_4$ and $K_2AlF_5$; mixtures of $K_2AlF_5$, cesium fluoroaluminate, and optionally $KAlF_4$; or mixtures thereof, and wherein the Li salt is LiF in an amount from 10.5 g to 15.5 g of LiF per 100 g of $K_2AlF_5$ or $Li_3AlF_6$ in an amount from 16.2 g to 24.3 g $Li_3AlF_6$ per 100 g of $K_2AlF_5$.

6. The modified flux of claim 5 wherein the amount of LiF is from 11.7 g to 14.3 g of LiF per 100 g of $K_2AlF_5$ or the amount of $Li_3AlF_6$ is from 18.2 g to 22.3 g $Li_3AlF_6$ per 100 g of $K_2AlF_5$.

7. Aluminum parts for brazing, coated at least partially with the modified flux according to claim 1.

8. Brazed aluminum parts, obtained by brazing them using the modified flux according to claim 1.

9. A process for brazing of parts made from aluminum or aluminum alloys wherein the modified flux according to claim 1 is coated on at least one of the parts to be brazed made from aluminum or aluminum alloys, and wherein said parts are heated to a temperature sufficiently high to braze said parts.

* * * * *